US012154778B2

(12) United States Patent
Ueno et al.

(10) Patent No.: US 12,154,778 B2
(45) Date of Patent: Nov. 26, 2024

(54) MULTI-TURN TIME-OF-FLIGHT MASS SPECTROMETER

(71) Applicant: SHIMADZU CORPORATION, Kyoto (JP)

(72) Inventors: Yoshihiro Ueno, Kyoto (JP); Ryugo Maeda, Kyoto (JP); Yusuke Tateishi, Kyoto (JP); Hiroyuki Miura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 327 days.

(21) Appl. No.: 17/632,293

(22) PCT Filed: Aug. 11, 2020

(86) PCT No.: PCT/JP2020/030593
§ 371 (c)(1),
(2) Date: Feb. 2, 2022

(87) PCT Pub. No.: WO2021/131140
PCT Pub. Date: Jul. 1, 2021

(65) Prior Publication Data

US 2022/0285143 A1 Sep. 8, 2022

(30) Foreign Application Priority Data

Dec. 24, 2019 (JP) ................................ 2019-232339

(51) Int. Cl.
*H01J 49/40* (2006.01)
*H01J 49/06* (2006.01)
*H01J 49/42* (2006.01)

(52) U.S. Cl.
CPC ........... *H01J 49/405* (2013.01); *H01J 49/06* (2013.01); *H01J 49/422* (2013.01)

(58) Field of Classification Search
CPC .......... H01J 49/00; H01J 49/02; H01J 49/405; H01J 49/06; H01J 49/422; H01J 49/423; H01J 49/408; H01J 49/063; H01J 49/4225

(Continued)

(56) References Cited

U.S. PATENT DOCUMENTS

2006/0214100 A1* 9/2006 Verentchikov .......... H01J 49/48 250/287
2008/0210862 A1* 9/2008 Yamaguchi ............. H01J 49/38 250/291

(Continued)

FOREIGN PATENT DOCUMENTS

JP 2012-099424 A 5/2012

OTHER PUBLICATIONS

International Search Report of PCT/JP2020/030593 dated Oct. 20, 2020 [PCT/ISA/210].

(Continued)

*Primary Examiner* — Jason L McCormack
(74) *Attorney, Agent, or Firm* — Sughrue Mion, PLLC

(57) ABSTRACT

An MT-TOFMS which is one mode of the present invention includes: a linear ion trap (2) configured to temporarily hold ions to be analyzed, and to eject the ions through an ion ejection opening (211) having a shape elongated in one direction; a loop flight section (3) configured to form a loop path (P) capable of making ions repeatedly fly; and a slit part (5) located on an ion path in which the ions ejected from the linear ion trap (2) travel until the ions are introduced into the loop path, the slit part configured to block a portion of the ions in a longitudinal direction of the ion ejection opening (211).

3 Claims, 3 Drawing Sheets

(58) Field of Classification Search
USPC ........................................ 250/281, 288, 291
See application file for complete search history.

(56) References Cited

U.S. PATENT DOCUMENTS

| | | | | |
|---|---|---|---|---|
| 2011/0248161 | A1* | 10/2011 | Takeshita ............. | H01J 49/424 250/287 |
| 2012/0112060 | A1 | 5/2012 | Kinugawa et al. | |
| 2015/0170898 | A1* | 6/2015 | Jiang .................. | H01J 49/0027 250/282 |
| 2019/0244801 | A1 | 8/2019 | Fujita | |

OTHER PUBLICATIONS

Written Opinion of PCT/JP2020/030593 dated Oct. 20, 2020 [PCT/ISA/237].
Notice of Allowance dated Jul. 12, 2022 issued for the corresponding Japanese Patent Application No. 2021-566802.
Office Action issued Feb. 26, 2024 in Chinese Application No. 202080053175.2.

* cited by examiner

Fig. 3A WITHOUT SLIT
Fig. 3B WITH SLIT
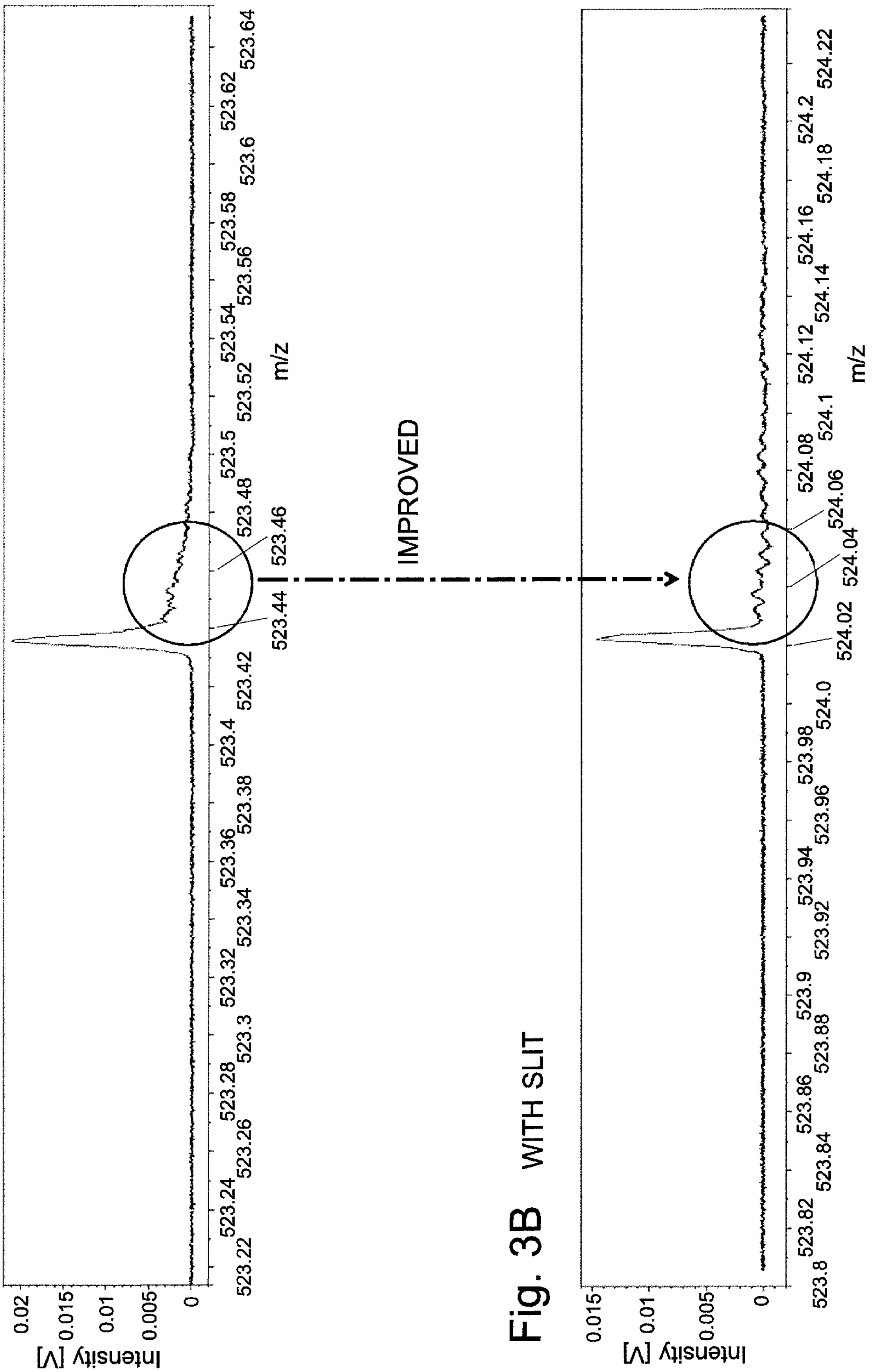

MULTI-TURN TIME-OF-FLIGHT MASS SPECTROMETER

TECHNICAL FIELD

The present invention relates to a time-of-flight mass spectrometer, and more specifically, to a multi-turn time-of-flight mass spectrometer.

BACKGROUND ART

In a time-of-flight mass spectrometer (which may be hereinafter abbreviated as the "TOFMS"), a specific amount of energy is imparted to ions originating from components in a sample, to inject the ions into a flight space. After being made to fly a specific distance, the ions are detected, and their respective times of flight are measured. Since the flying speed of an ion within the flight space depends on the ion's mass-to-charge ratio (strictly, this should be noted as "m/z" in italic type, although the commonly used term "mass-to-charge ratio" is used here), the mass-to-charge ratio of the ion can be determined from the measured time of flight. The longer the flight distance is, the higher the mass-resolving power of the TOFMS is. However, in general, increasing the flight distance requires the device to be larger in size.

As one type of TOFMS for solving this problem, a multi-turn time-of-flight mass spectrometer (which may be hereinafter abbreviated as the "MT-TOFMS") has been known (see Patent Literature 1 or other documents). In a MT-TOFMS, ions are made to fly a large number of times along a loop path having a closed shape, such as a substantially circular shape, substantially elliptical shape or figure-eight shape, or along a quasi-loop path, such as a helical path (these types of paths are hereinafter collectively called the "loop path"), whereby a significant flight distance can be secured within a comparatively small space.

CITATION LIST

Patent Literature

Patent Literature 1: JP 2012-99424 A

SUMMARY OF INVENTION

Technical Problem

In order to realize a high level of detection sensitivity in a MT-TOFMS, it is preferable that the largest possible number of ions be injected into the loop path. As one method for achieving this goal, an attempt has been made to combine a MT-TOFMS with a linear ion trap, which has a larger capacity for accumulating ions than a three-dimensional quadrupole ion trap. However, an experiment by the present inventors has revealed that, when a mass spectrometric analysis is performed for ions which have been ejected from a linear ion trap and introduced into the loop path in a MT-TOFMS, a significant variation occurs in the time of flight of ions having the same mass-to-charge ratio (i.e., the degree of time focusing is low), so that the peak on the mass spectrum becomes broadened.

The present invention has been developed to solve the previously described problem. Its objective is to provide a multi-turn time-of-flight mass spectrometer which can realize high levels of mass accuracy and mass-resolving power while improving detection sensitivity.

Solution to Problem

One mode of the multi-turn time-of-flight mass spectrometer according to the present invention developed for solving the previously described problem includes:

a linear ion trap configured to temporarily hold ions to be analyzed, and to eject the ions through an ion ejection opening having a shape elongated in one direction;

a loop flight section configured to form a loop path capable of making ions repeatedly fly; and a slit part located on an ion path in which the ions ejected from the linear ion trap travel until the ions are introduced into the loop path, the slit part configured to block a portion of the ions in a longitudinal direction of the ion ejection opening.

The loop path may be a completely closed path in which ions which depart from a point on the path will return to the same point after making a single turn in the loop path. However, as noted earlier, it may also be an incompletely closed path in which ions gradually change their orbiting position for every turn, as in a helical path.

Advantageous Effects of Invention

In the MT-TOFMS according to the previously described mode of the present invention, when ions are ejected from the linear ion trap, the ions are ejected in the form of a packet, being spread in a rod-like or elongated rectangular shape in a plane orthogonal to their direction of travel. The slit part blocks a portion of those ions in the longitudinal direction.

In a MT-TOFMS, the shape and arrangement of the electrodes forming the loop path, voltages applied to those electrodes, as well as other related elements are designed so as to ensure the highest possible degree of time focusing, i.e., so as to make ions having the same mass-to-charge ratio arrive at the detector as simultaneously as possible, against the variation in the initial position of the ions in the accelerating phase, variation in the amount of initial energy imparted to the ions, variation in the initial direction of motion of the ions and other factors related to the process of accelerating ions to inject them into the loop path. However, common types of MT-TOFMSs have a comparatively small area within which ions on the loop path can satisfactorily (i.e., in a highly time-focused form) pass through the cross-sectional plane orthogonal to the central axis of the loop path. By comparison, in the MT-TOFMS according to the previously described mode of the present invention, the spread shape of the ions in the plane orthogonal to the direction of travel of the ions is appropriately altered by the slit part. Consequently, the spread of the ions is reduced to an area within which ions can pass through in a time-focused form on the loop path.

If an excessive amount of ions is introduced into the loop path, the ions having the same mass-to-charge ratio tend to spread ahead and behind in their direction of travel with the increasing number of turns in the loop path due to the space-charge effect of the ions which form a mass. By comparison, in the MT-TOFMS according to the previously described mode of the present invention, since the amount of ions is appropriately restricted due to the partial blockage of the ions by the slit part, an excessive space-charge effect due to the ions is less likely to occur, so that the ions are less likely to be spread ahead and behind in their direction of travel.

Thus, the MT-TOFMS according to the previously described mode of the present invention can achieve a high level of detection sensitivity by introducing an adequate amount of ions into the loop path, while ensuring the time focusing of the ions having the same mass-to-charge ratio during their flight to achieve high levels of mass accuracy and mass-resolving power.

BRIEF DESCRIPTION OF DRAWINGS

FIGS. 3A and 3B are graphs showing a comparison of mass spectra actually measured with and without the slit in the MT-TOFMS according to the present embodiment.

DESCRIPTION OF EMBODIMENTS

One embodiment of the MT-TOFMS according to the present invention is hereinafter described with reference to the attached drawings.

Figure 1:
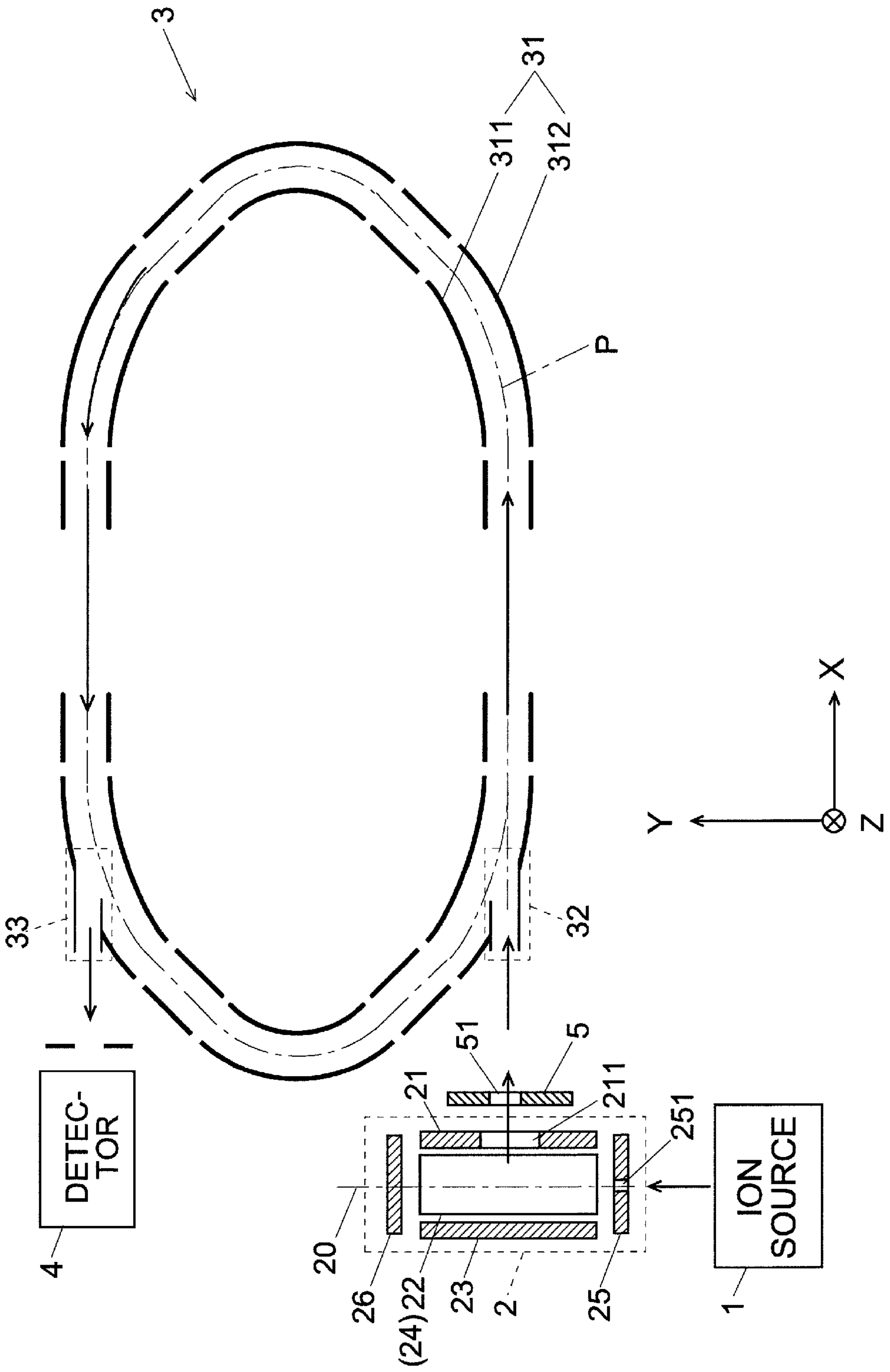
FIG. 1 is a schematic configuration diagram of a MT-TOFMS which is one embodiment of the present invention.

FIG. 1 is a schematic configuration diagram of the MT-TOFMS according to the present embodiment.

The MT-TOFMS according to the present embodiment includes: an ion source 1 configured to generate ions originating from a sample; a linear ion trap 2 configured to capture and accumulate the generated ions by the effect of a radio-frequency electric field; a loop flight section 3 configured to form a loop path in which ions ejected from the linear ion trap 2 are made to fly an appropriate number of times; a detector 4 configured to detect ions which have finished flying in the loop path and have left the same path; and a slit part 5 located between the linear ion trap 2 and the loop flight section 3, having an ion passage opening of a predetermined size.

The linear ion trap 2 includes four plate electrodes 21-24 arranged around a linear central axis 20 and parallel to the same central axis 20 (in FIG. 1, the plate electrode 24 is located on the near side of the central axis 20); and a pair of end-cap electrodes 25 and 26 respectively arranged on the outside of the two ends of the four plate electrodes 21-24. In the end-cap electrode 25 closer to the ion source 1, an ion injection hole 251 of a predetermined size is formed, with its center on the central axis 20. In the plate electrode 21 closest to the loop flight section 3, an ion ejection opening 211 having an elongated rectangular shape extending parallel to the central axis 20 is formed. Additionally, a voltage generator (now shown) for applying predetermined voltages to the electrodes 21-24, 25 and 26, respectively, is provided.

As for the configuration of the linear ion trap 2, the plate electrodes 21-24 may be replaced by rod electrodes having a cylindrical (or columnar) cross section or rod electrodes whose surfaces facing the central axis 20 have a hyperbolic shape in the cross section.

The loop flight section 3 includes a plurality of pairs of loop electrodes 31, with each pair consisting of inner and outer electrodes 311 and 312 having a substantially sector form or parallel-plate form, as well as an entrance-side gate electrode 32 and an exit-side gate electrode 33. Additionally, a voltage generator (now shown) for applying predetermined voltages to the electrodes 31, 32 and 33, respectively, is provided. In the present example, a completely closed loop path P having a roughly elliptical shape is formed. Understandably, the shape of the loop path is not limited to this one. Furthermore, as already noted, it is natural that the loop path does not need to be a completely closed path.

As shown in FIG. 1, the loop path P is formed in a plane which contains the X and Y axes orthogonal to each other, with the X-axis direction defined as the direction in which ions are injected into the loop path P through the entrance-side gate electrode 32. Accordingly, in the present case, a plane orthogonal to the direction of travel of the ions at the point of injection of the ions into the loop path P is the Y-Z plane.

Figure 2:
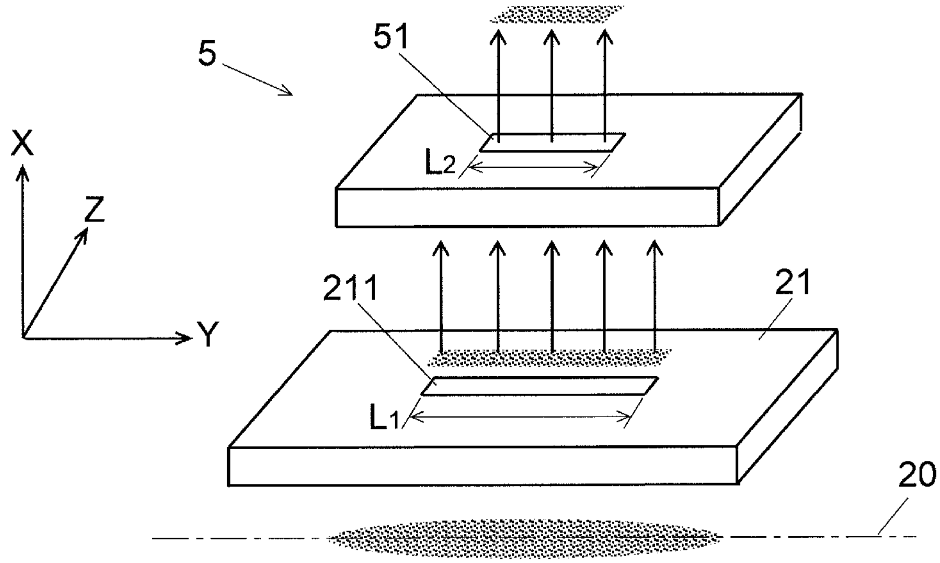
FIG. 2 is a model diagram showing the state of blockage of ions by a slit in the MT-TOFMS according to the present embodiment.

The slit part 5, which is arranged parallel to the Y-Z plane and close to the ion ejection opening 211 of the linear ion trap 2, has an ion passage opening 51 having a rectangular shape elongated in the Y-axis direction. As shown in FIG. 2, the longitudinal length $L_2$ of the ion passage opening 51 is determined to be shorter than the longitudinal length $L_1$ of the ion ejection opening 211 of the linear ion trap 2.

An analytical operation in the MT-TOFMS according to the present embodiment is hereinafter described.

The ion source 1 produces ions originating from a sample. The generated ions are introduced through the ion injection hole 251 into the inner space of the linear ion trap 2, to be accumulated within the inner space by the effect of the radio-frequency electric field. The linear ion trap 2 additionally allows for the dissociation of the ions by collision induced dissociation or similar methods. After a sufficient amount of ions have been accumulated within the inner space of the linear ion trap 2, the radio-frequency voltages applied to the plate electrodes 21 and 23 facing each other are replaced by predetermined DC voltages. Due to the thereby created acceleration electric field, kinetic energy is imparted to the ions which have been accumulated until then. Consequently, the ions are simultaneously ejected through the ion ejection opening 211.

In the process of accumulating ions within the linear ion trap 2, the accumulated ions are spread along the direction of the central axis 20 (Y-axis direction) within the inner space of the linear ion trap 2. Therefore, at the moment of the ion ejection, a packet-like mass of ions roughly extending in the Y-axis direction are ejected from the almost entire area of the ion ejection opening 211. Accordingly, the area within which the ions are present on a plane orthogonal to the direction of travel of the ions (Y-Z plane) has a rectangular shape elongated in the Y-axis direction, as shown in FIG. 2. When this packet of ions arrives at the split part 5, ions which are present at or near the ends of the packet are blocked and cannot pass through the ion passage opening 51 since the length $L_2$ of the ion passage opening 51 in the Y-axis direction is shorter than the length $L_1$ of the ion ejection opening 211. Therefore, the area within which ions are present on the plane orthogonal to the direction of travel of the packet of ions travelling through the ion passage opening 51 toward the loop flight section 3 is shaped into a rectangular area which is shorter in the Y-axis direction than the area where the ions forming the original packet are present. The amount of ions is also decreased through this process.

In the loop flight section 3, a loop path P in which ions can repeatedly turn a large number of times is formed by the sector electric fields and linear electric fields created by the plurality of pairs of loop electrodes 31. The packet of ions which have passed through the ion passage opening 51 in the slit part 5 mentioned earlier is guided into the loop path P by the entrance-side gate electrode 32. Ideally, the kinetic energy is equally imparted to the ions when they are ejected from the linear ion trap 2, making each ion fly at a speed corresponding to its mass-to-charge ratio; i.e., the smaller the mass-to-charge ratio is, the higher the flying speed of the ion is. The ions fly along the loop path P. During this flight, the packet of ions is broken apart, ahead and behind in their direction of travel, according to the speeds of respective flying ions, or mass-to-charge ratios.

In the plane orthogonal to the central axis of the loop path P, the area within which ions can ideally pass through, i.e., the area within which ions can pass through in a highly time-focused form, is limited to a certain extent. Allowing the entry of ions outside this area would make it impossible to maintain the degree of time focusing of the ions. However, in the present MT-TOFMS, since the spread of the ions, particularly in the Y-axis direction, is restricted at the slit part 5, most of the ions introduced into the loop path P can enter the aforementioned area within which ions can pass through in a highly time-focused form.

If an excessive amount of ions were introduced into the loop path P, like-charged ions would repel each other, so that even ions having the same mass-to-charge ratio would vary in position in the direction of travel. However, since the entire volume of the ions is also decreased at the slit part 5, the positional variation due to the space-charge effect of the ions is less likely to occur. Therefore, ions having the same mass-to-charge ratio will fly in a highly time-focused form.

The ions which have thus made a predetermined number of turns in the loop path P leave the same path P, pass through the exit-side gate electrode 33 and travel toward the detector 4. The detector 4 produces a detection signal corresponding to the amount of incident ions. As just described, ions having the same mass-to-charge ratio are maintained in a highly time-focused form during their flight along the loop path P in the loop flight section 3. Therefore, ions originating from the sample and having the same mass-to-charge ratio almost simultaneously arrive at the detector 4. Therefore, the intensity signal of the ions originating from the sample and having the same mass-to-charge ratio appears as a narrow peak in the detection signal produced by the detector 4.

FIGS. 3A and 3B show a comparison of mass spectra actually measured with and without the slit part 5 in the MT-TOFMS according to the present embodiment. When the slit part 5 is omitted and all ions ejected from the linear ion trap 2 are introduced into the loop path P, a significant tailing will be observed in the peak of a specific ion originating from the sample, as shown in FIG. 3A. This demonstrates that some ions are delayed during their flight due to various factors. By comparison, when the spread of the ions is restricted by providing the slit part 5, the tailing is almost eliminated and a narrow, sharp peak can be observed, as shown in FIG. 3B.

This fact shows that the partial blocking of the ions by the slit part 5 placed in the ion path between the ion ejection opening 211 of the linear ion trap 2 and the entrance-side gate electrode 32 of the loop flight section 3 produces an unmistakable effect of improving the mass-resolving power and mass accuracy. Although the height of the peak in FIG. 3B is lower than that in FIG. 3A, the extent of the decrease is approximately 30%. Thus, the extent of decrease in ion intensity due to the provision of the slit part 5 is not significantly large, and therefore, the MT-TOFMS according to the present embodiment can achieve a high level of detection sensitivity by making use of the advantageous feature of the linear ion trap 2 which has a large capacity for accumulating ions.

In the MT-TOFMS according to the previously described embodiment, the opening shape of the ion passage opening 51 in the slit part 5 on the X-Y plane is symmetrical with respect to the line connecting the center in the longitudinal direction of the ion ejection opening 211 of the linear ion trap 2 and the central axis of the loop path P at the entry point of the ions which have passed through the entrance-side gate electrode 32. However, the opening shape may be asymmetrical. That is to say, the condition for allowing the ions to pass through the plane orthogonal to the central axis of the loop path P is not strictly symmetrical since there is a difference in terms of the ion passage condition between the inner and outer areas of the sector electric field created by the loop electrodes 31. Therefore, making the opening shape of the ion passage opening 51 in the slit part 5 be asymmetrical to fit for the ion passage condition will make it possible to achieve a higher degree of time focusing while decreasing the loss of the ions.

It is evident that the previously described embodiment is one example of the present invention and will fall within the scope of claims of the present application even if any modification, change or addition is appropriately made within the gist of the present invention.

[Various Modes]

A person skilled in the art can understand that the previously described illustrative embodiment is a specific example of the following modes of the present invention.

(Clause 1) A multi-turn time-of-flight mass spectrometer according to one mode of the present invention includes:

- a linear ion trap configured to temporarily hold ions to be analyzed, and to eject the ions through an ion ejection opening having a shape elongated in one direction;
- a loop flight section configured to form a loop path capable of making ions repeatedly fly; and
- a slit part located on an ion path in which the ions ejected from the linear ion trap travel until the ions are introduced into the loop path, the slit part configured to block a portion of the ions in a longitudinal direction of the ion ejection opening.

The multi-turn time-of-flight mass spectrometer described in Clause 1 can achieve a high level of detection sensitivity by introducing an adequate amount of ions into the loop path while ensuring the time focusing of the ions having the same mass-to-charge ratio during their flight. This reduces the peak width of a peak originating from ions having the same mass-to-charge ratio in a mass spectrum, so that high levels of mass accuracy and mass-resolving power can be achieved.

(Clause 2) In the multi-turn time-of-flight mass spectrometer described in Clause 1, the loop path may be formed on a flat plane, and an ion passage opening in the slit part may have a shape elongated in one direction on the flat plane.

By the multi-turn time-of-flight mass spectrometer described in Clause 2, in particular, the dispersion in time of flight of the ions having the same mass-to-charge ratio due to the influence of the sector electric field for bending the direction of travel of the ions can be reduced. This is effective for improving the mass accuracy and mass-resolving power.

(Clause 3) In the multi-turn time-of-flight mass spectrometer described in Clause 2, the linear ion trap and the loop flight section may be arranged relative to each other so that an ion which departed from the center in the longitudinal direction of the ion ejection opening enters the loop path at a central axis of the loop path, and the passage opening in the slit part may have an asymmetrical shape in the longitudinal direction with respect to a position at which the ion which departed from the center in the longitudinal direction of the ion ejection opening passes through.

In the multi-turn time-of-flight mass spectrometer described in Clause 3, ions can be effectively blocked according to the ion passage condition which can vary due to the sector electric fields for creating the loop path or other factors. This makes it possible to realize high levels of mass accuracy and mass-resolving power while reducing the loss of the ions to ensure the highest possible level of detection sensitivity.

REFERENCE SIGNS LIST

1 . . . Ion Source
2 . . . Linear Ion Trap
20 . . . Central Axis
21-24 . . . Plate Electrode
211 . . . Ion Ejection Opening
25,26 . . . End-Cap Electrode
251 . . . Ion Injection Hole
3 . . . Loop Flight Section
31 . . . Loop Electrode
32 . . . Entrance-Side Gate Electrode
33 . . . Exit-Side Gate Electrode
4 . . . Detector
5 . . . Slit Part
51 . . . Ion Passage Opening
P . . . Loop Path

The invention claimed is:

1. A multi-turn time-of-flight mass spectrometer, comprising:

a linear ion trap configured to temporarily hold ions to be analyzed, and to eject the ions through an ion ejection opening having a shape elongated in one direction;

a loop flight section configured to form a loop path capable of making ions repeatedly fly; and a slit part located on an ion path in which the ions ejected from the linear ion trap travel until the ions are introduced into the loop path, the slit part having an ion passage opening whose length in the one direction is shorter than a length of the ion ejection opening in the one direction and configured to block a portion of the ions in the one direction of the ion ejection opening.

2. The multi-turn time-of-flight mass spectrometer according to claim 1, wherein the loop path is formed on a flat plane, and the ion passage opening has a shape elongated in the one direction on the flat plane.

3. The multi-turn time-of-flight mass spectrometer according to claim 2, wherein the linear ion trap and the loop flight section are arranged relative to each other so that an ion which departed from a center in the longitudinal direction of the ion ejection opening enters the loop path at a central axis of the loop path, and the ion passage opening in the slit part has an asymmetrical shape in the longitudinal direction with respect to a position at which the ion which departed from the center in the longitudinal direction of the ion ejection opening passes through.

* * * * *